US012707290B2

(12) United States Patent
Kim et al.

(10) Patent No.: US 12,707,290 B2
(45) Date of Patent: Aug. 11, 2026

(54) METHOD AND APPARATUS FOR ACTIVE TERMINAL DETECTION USING SPREAD CODE LEARNED BY USING DEEP LEARNING IN MULTIPLE COMMUNICATIONS

(71) Applicant: SEOUL NATIONAL UNIVERSITY R&DB FOUNDATION, Seoul (KR)

(72) Inventors: Nam Ik Kim, Seoul (KR); Kwang Bok Lee, Seoul (KR); Byong Hyo Shim, Seoul (KR); Dong Woo Kim, Suwon-si (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 18/515,219

(22) Filed: Nov. 20, 2023

(65) Prior Publication Data

US 2024/0089754 A1 Mar. 14, 2024

Related U.S. Application Data

(63) Continuation of application No. PCT/KR2022/007244, filed on May 20, 2022.

(30) Foreign Application Priority Data

May 21, 2021 (KR) ........................ 10-2021-0065193
May 20, 2022 (KR) ........................ 10-2022-0062160

(51) Int. Cl.
*H04W 24/02* (2009.01)
*H04B 1/7103* (2011.01)
*H04J 13/10* (2011.01)

(52) U.S. Cl.
CPC .......... *H04W 24/02* (2013.01); *H04B 1/7103* (2013.01); *H04J 13/10* (2013.01)

(58) Field of Classification Search
CPC ...... H04W 24/02; H04B 1/7103; H04J 13/10; H04J 11/00; H04J 13/00; H04J 13/16; H04L 5/00
See application file for complete search history.

(56) References Cited

U.S. PATENT DOCUMENTS 7,554,956 B2 6/2009 Kang et al.
8,331,247 B2 12/2012 Li et al.
(Continued)

FOREIGN PATENT DOCUMENTS

KR 10-1701421 B1 2/2017
KR 10-2019-0014928 A 2/2019
(Continued)

OTHER PUBLICATIONS

KR 102267855 B1 translation, provided by EPO Espacenet.com on Jan. 31, 2025; pub. Jun. 23, 2021.*
(Continued)

*Primary Examiner* — Rebecca E Song
*Assistant Examiner* — Gary A Miller
(74) *Attorney, Agent, or Firm* — NSIP Law

(57) ABSTRACT

Embodiments of the present disclosure provide an active terminal detection method and an active terminal detection device that increase the performance of determining whether a terminal is active by designing a spread code to reduce a cross-correlation value of the spread code of a terminal with a high activation frequency in a massive machine-type communication environment by using deep learning.

8 Claims, 7 Drawing Sheets

(56) References Cited

U.S. PATENT DOCUMENTS

| | | | | |
|---|---|---|---|---|
| 2018/0351600 | A1* | 12/2018 | Kang et al. | H04B 1/69 |
| 2023/0412429 | A1* | 12/2023 | Shim et al. | H04L 25/02 |

FOREIGN PATENT DOCUMENTS

| | | | | | |
|---|---|---|---|---|---|
| KR | 10-2056403 | B1 | | 12/2019 | |
| KR | 10-2020-0066220 | A | | 6/2020 | |
| KR | 102267855 | B1 | * | 6/2020 | H04L 25/02 |
| KR | 20200066220 | A | * | 6/2020 | H04W 4/70 |

OTHER PUBLICATIONS

International Search Report issued on Aug. 18, 2022 for counterpart of PCT/KR2022/007244.

Kim, Namik, et al. "Deep learning-based spreading sequence design and active user detection for massive machine-type communications." *IEEE Wireless Communications Letters* 10.8 (2021): pp. 1618-1622.

* cited by examiner

METHOD AND APPARATUS FOR ACTIVE TERMINAL DETECTION USING SPREAD CODE LEARNED BY USING DEEP LEARNING IN MULTIPLE COMMUNICATIONS

CROSS-REFERENCE TO RELATED APPLICATION

This application is a by-pass continuation of International Application No. PCT/KR2022/007244, filed on May 20, 2022 in the Korean Intellectual Property Receiving Office, which is based on and claims priority to Korean Application No. 10-2021-0065193, filed on May 21, 2021 and No. 10-2022-0062160, filed on May 20, 2022 in the Korean Intellectual Property Office, the entire disclosures of which are incorporated herein by reference.

BACKGROUND

Embodiments of the present disclosure relate to an active terminal detection method and an active terminal detection device that use a spread code learned by using deep learning in multiple communications, and more specifically, to a method and device for increasing active terminal detection performance by using deep learning in multiple communications. The active terminal detection is defined to include an active user detection or an active user terminal detection.

Recently, the Internet of Things (IoT), which connects smart devices to each other through wireless communication, has been receiving a lot of attention. While the known communication systems are focused on human-centric communications, the Internet of Things focuses on object-oriented communication, such as automatic driving which is basic technology for smart city, smart mirroring, and industrial automation, and video surveillance.

In order to realize the Internet of Things, multiple machine-type devices (MTDs) have to be able to communicate with a base station (BS) at the same time, which is called massive machine-type communications (MMTC). Each machine-type device has to be able to be connected to a base station and transmit data thereto at the desired moment.

When the communication system of related art assumes tens of thousands of users per 1 $km^2$, there may be more than 1 million devices per 1 $km^2$ in massive machine-type communications. Accordingly, there is a problem that the number of devices that have to be connected is greater than the number of communication resources (time, frequency, and so on) that may be allocated to devices in a machine-type communication environment. In the massive machine-type communication environment where the number of devices has increased by more than 100 times, new communication technology is required, unlike the known communication technology.

In the scheduling-based orthogonal multiple access (OMA) method of related art, data is transmitted to a base station through steps, such as access attempt, connection, and authentication. Accordingly, there are a problem in that overhead of a connection process is large compared to a data size in machine-type communication where the data size is small, and a problem in that massive machine-type communication is difficult due to lack of resources.

In order to solve the problems, a grant-free non orthogonal multiple access (GF_NOMA) method has been proposed, and in this access method, a terminal device may transmit data without complicated scheduling by using a non-orthogonal spread code.

In addition, in the known spread code, a cross-correlation value of the spread code is designed to be minimized. However, because the massive machine-type communication environment was not considered, in a communication method designed to minimize a cross-correlation value of a spread code, active terminal detection performance is reduced in a massive machine-type communication environment where activation frequencies between object devices are different from each other.

Recently, problems that are difficult to model mathematically have been solved by utilizing deep learning techniques that implement complex functions into artificial neural networks through data-based training in various fields. In other words, the problem of optimizing codes and algorithms suitable for different communication environments using mathematical algorithms is difficult to address, but by using deep learning, spread codes and detection algorithms with characteristics suitable for a given communication environment through data-based learning may be desinged. The present disclosure uses deep learning as a technique to design a spread code suitable for various communication environments and detect multiple users.

SUMMARY

An active terminal detection method and an active terminal detection device according to embodiments of the present disclosure implement the entire communication process (a terminal transmits a signal, and a base station receives the signal and detects an active device) with an end-to-end deep neural network in order to reduce active device detection errors by using deep learning. The present disclosure provides a method of detecting a spread code and an active device (from a base station) that reduces active device detection errors in a corresponding environment by learning the entire deep neural network based on data of communication environment.

In addition, the present disclosure provides an active terminal detection method and an active terminal detection device that may increase active terminal detection performance by designing spread codes suitable for various communication environments (particularly, environments with different transmission frequencies of devices) including massive machine-type communication environments.

However, the technical challenges that the embodiments aim to achieve are not limited to the technical challenges described above, and other technical challenges may exist.

According to an aspect of the present disclosure, an active terminal detection method includes forming, by an active terminal detection device, an end-to-end learning structure by using a first learning network that transmits a first signal generated by each of the plurality of terminals to the receiver and a second learning network that determines whether each of the plurality of terminals is active, generating a spread code learned by using the end-to-end learning structure, generating a second signal corresponding to each of the plurality of terminals by combining the spread code with the first signal, and determining whether each of the plurality of terminals is active based on the second signal.

In addition, the generating of the second signal may include generating the spread code to reduce a cross-correlation value of a spread code of a terminal with a high activation frequency.

In addition, the generating of the second signal may include performing learning of the first learning network by using a single-layer linear neural layer.

In addition, the determining whether each of the plurality of terminals is active may include deriving a weight and a bias value by using an error value, activation probability of each of the plurality of terminals, channels of the plurality of terminals and the receiver, and the number of the plurality of terminals, and performing learning of the second learning network to such that the error value is smallest by using the weight and the bias value.

In addition, the determining whether each of the plurality of terminals is active may include performing learning of the second learning network by using batch normalization and a residual network.

According to another aspect of the present disclosure, an active terminal detection device includes a memory storing an active terminal detection program, and a processor configured to execute the active terminal detection program, wherein the active terminal detection program forms, by using an active terminal detection device, an end-to-end learning structure by using a first learning network that transmits a first signal generated by each of the plurality of terminals to the receiver and a second learning network that determines whether each of the plurality of terminals is active, generates a spread code learned by using the end-to-end learning structure, generates a second signal corresponding to each of the plurality of terminals by combining the spread code with the first signal, and determines whether each of the plurality of terminals is active based on the second signal.

In addition, the processor may generate the spread code to reduce a cross-correlation value of a spread code of a terminal with a high activation frequency.

In addition, the processor may perform learning of the first learning network by using a stochastic gradient descent algorithm.

In addition, the processor may derive a weight and a bias value by using an error value, activation probability of each of the plurality of terminals, channels of the plurality of terminals and the receiver, and the number of the plurality of terminals, and may perform learning of the second learning network to such that the error value is smallest by using the weight and the bias value.

In addition, the processor may perform learning of the second learning network by using batch normalization and a residual network.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
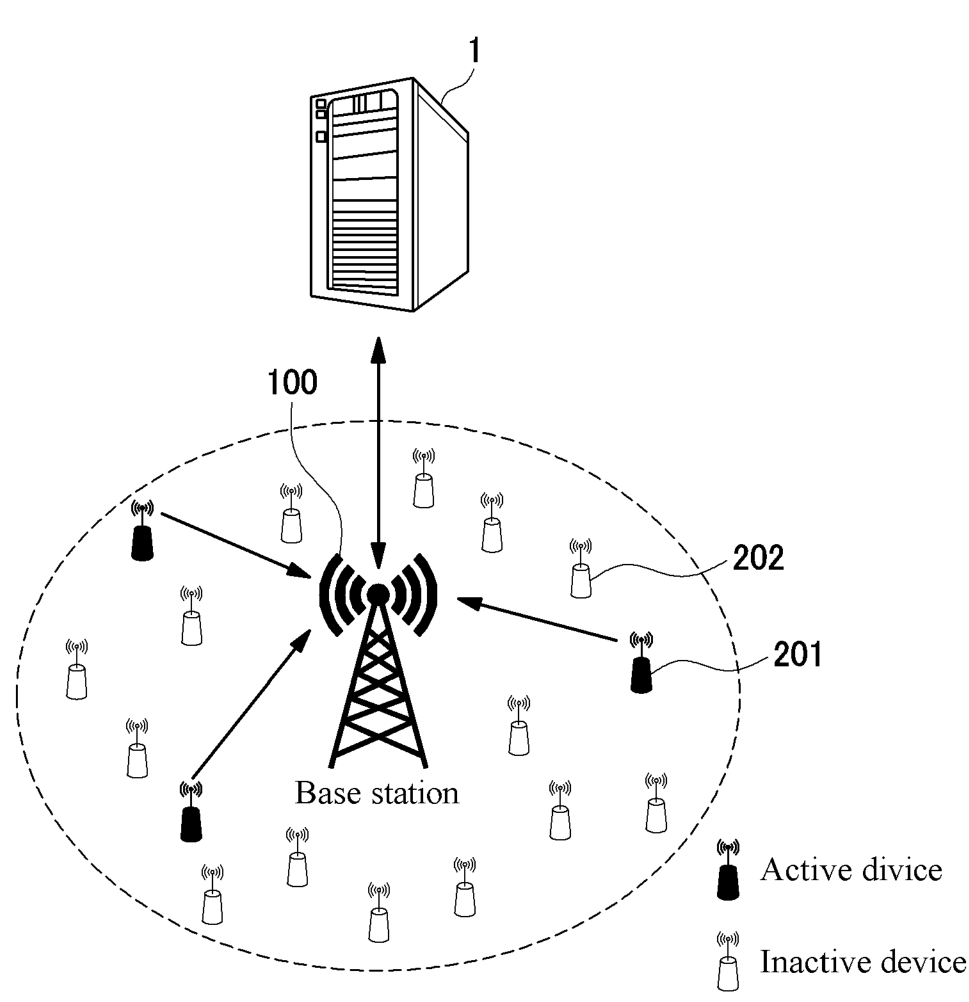
FIG. 1 is an example of a massive machine-type communication environment according to an embodiment.

Hereinafter, embodiments of the present disclosure will be described in detail such that those skilled in the art to which the present disclosure belongs may easily implement the present disclosure with reference to the accompanying drawings. However, the present disclosure may be implemented in many different forms and is not limited to the embodiments to be described herein. In addition, in order to clearly describe the present disclosure with reference to the drawings, portions irrelevant to the description are omitted, and similar reference numerals are attached to similar portions throughout the specification.

When it is described that a portion is "connected" to another portion throughout the specification, this includes not only a case where the portion is "directly connected" to another portion but also a case where the portion is "indirectly connected" to another portion with another component therebetween. Throughout the specification of the present application, when it is described that a portion "includes" a certain component, this means that the portion may further include another component without excluding another component unless otherwise stated.

In the present disclosure, a "portion" includes a unit realized by hardware, a unit realized by software, and a unit realized by using both. In addition, one unit may be realized by using two or more pieces of hardware, and two or more units may be realized by using one piece of hardware. Meanwhile, a "~portion" is not limited to software or hardware, and a "~portion" may be configured to be included in an addressable storage medium or may be configured to reproduce one or more processors. Therefore, in one example, "~portion" refers to components, such as software components, object-oriented software components, class components, and task components, and includes processes, functions, properties, and procedures, subroutines, segments of program code, drivers, firmware, microcode, circuits, data, databases, data structures, tables, arrays, and variables. The functions provided within the components and "portions" may be combined into a smaller number of components and "portions" or may be further separated into additional components and "portions". Additionally, components and "portions" may be implemented to refresh one or more central processing units (CPUs) within the device.

In addition, the attached drawings are only for easy understanding of the embodiments disclosed in the present disclosure, and the technical idea disclosed in the present disclosure is not limited by the attached drawings, and should be understood to include all modifications, equivalents and substitutes included in the ides and technical scope of the present disclosure.

Terms including ordinal numbers, such as first, second, and so on, may be used to describe various components, but the components are not limited by the terms. The above terms are used only for the purpose of distinguishing one component from another component.

It should be understood that, when a component is said to be is "connected" or "coupled" to another component, the component may be directly connected to or coupled to another component but there may be another component therebetween. Meanwhile, it should be understood that, when a component is "directly connected" or "directly coupled" to another component, there is another component therebetween.

Singular expressions include plural expressions, unless the context clearly indicates otherwise.

In the present disclosure, it should be understood that terms such as "comprise", "include", or "have" are intended to designate the presence of features, numbers, steps, operations, components, portions, or a combination thereof described in the specification, and do not exclude in advance the presence or addition of one or more other features, numbers, steps, operations, components, portions, or combinations thereof.

Hereinafter, a massive machine-type communication (MMTC) environment according to an embodiment is described with reference to FIG. 1.

FIG. 1 is an example of a massive machine-type communication environment according to an embodiment.

Referring to FIG. 1, an area of FIG. 1 represents a coverage area of a receiver 100. The receiver 100 includes a device, such as a base station, which communicates with a plurality of terminals or receives signals from the plurality of terminals. In the massive machine-type communication environment, 1 million terminals (devices) or more may be in the coverage area.

However, the embodiment is not limited to a case where the number of devices in the coverage area of the receiver 100 is 1 million or more, and includes a case where the number of machine-type devices in the coverage area is multiple or a case where the number (N) of terminals (devices) is greater than the number of spread codes.

In addition, the terminal according to the embodiment includes a terminal capable of performing machine-type communication. Accordingly, the terminal according to the embodiment may include all terminal devices that may transmit and receive data to and from or perform machine-type communication with the receiver 100, such as a sensor, a robot, or a vehicle.

A plurality of terminals may communicate with the receiver 100, and the receiver 100 may communicate with the active terminal detection device 1. In addition, the active terminal detection device 1 may also refer to a device that controls machine-type communication between a plurality of terminals and the receiver 100 or a component included in the receiver 100 to detect an active terminal.

A plurality of devices in the coverage area of the receiver 100 may be classified into active devices 201 and inactive devices 202. As illustrated in FIG. 1, not all terminals in the coverage area of the receiver 100 operate in an active state in which data is transmitted, and some terminals may be in an inactive state in which data is not transmitted to the receiver 100.

Accordingly, each of the active devices 201 refers to a terminal device that transmits data to the receiver 100, and each of the inactive devices 202 may correspond to a terminal device that does not transmit data to the receiver 100.

In this case, the active devices 201 do not continuously transmit data and may be converted into the inactive devices 202 depending on whether data is transmitted. Likewise, the inactive devices 202 may also be converted into the active devices 201 depending on whether data is transmitted. A data transmission method of the terminal is described below in detail with reference to FIG. 2.

Hereinafter, a data symbol uplink method of a terminal in a massive machine-type communication environment, according to an embodiment, is described with reference to FIG. 2.

Figure 2:
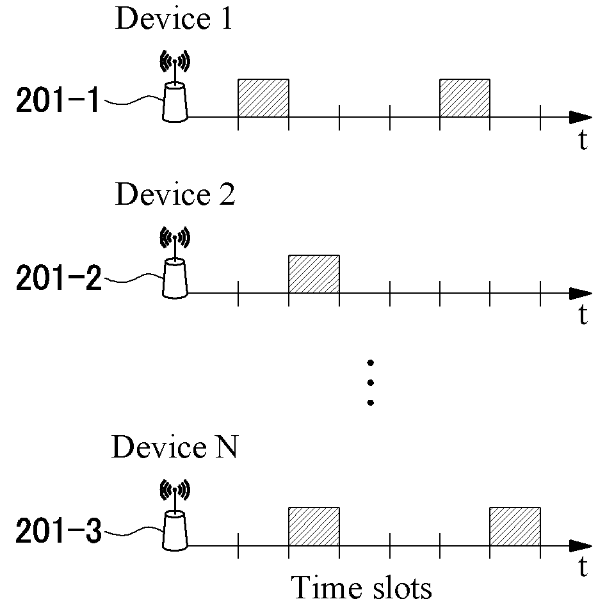
FIG. 2 is an example of a data symbol uplink method of a terminal in a massive machine-type communication environment, according to an embodiment.

FIG. 2 is an example of a data symbol uplink method of a terminal in a massive machine-type communication environment, according to an embodiment.

Referring to FIG. 2, in a massive machine-type communication environment, the devices 201 and 202 do not continuously transmit and receive data to and from the receiver 100, but each of a plurality of terminals may transmit and receive data intermittently (sporadically) with a long transmission cycle.

Specifically, as illustrated in FIG. 2, a transmission cycle includes a plurality of time slots, and during the transmission cycle, each of terminals 201-1, 201-2, and 201-3 intermittently transmit and receive data to and from a base station during one or more time slots. Accordingly, the number of terminals that actually transmit data during one time slot is less than the number of terminals that are in the coverage area of the receiver 100.

In an intermittent data transmission environment in which each of the plurality of devices 201 and 202 intermittently transmits and receives data to and from the receiver 100 with a long transmission cycle, a compressed-sensing-based multi-user detection (CS-MUD) technique may be used to identify the active devices 201 that actually transmit data by applying a compressive sensing algorithm.

In the compressed-sensing-based multi-user detection technique, a spread code (spreading sequence) is assigned to each of the devices 201 and 202 in the coverage area of the receiver 100. Accordingly, the active devices 201 are derived by deriving a cross-correlation value between spread codes assigned to the respective terminals.

in this case, as the cross-correlation value between spread codes increases, interference between the active devices 201 and 202 increases, and thereby, the detection performance of the active devices 201 is reduced. Accordingly, the smaller the cross-correlation value between the spread codes assigned to the plurality of devices 201 and 202, the more active the detection performance of devices 201 increases.

However, a method of simply designing codes to minimize a cross-correlation value between spread codes is not suitable for a massive machine-type communication environment. Accordingly, when the activation frequencies of the plurality of devices 201 and 202 are different from each other, active terminal detection performance is reduced in a massive machine-type communication environment in which there are many devices 201 and 202 in the coverage area of the receiver 100.

Accordingly, a method of designing the spread code appropriately according to the communication environment, such as activation probability of the terminals 201 and 202 and the number of terminals, rather than simply designing the cross-correlation value between the spread codes to be reduced, in order to increase active terminal detection performance in a case where activation frequencies of the terminals 201 and 202 are different from each other and in a massive machine-type communication environment, is described with reference to FIGS. 4 to 7 to be described below.

Hereinafter, configuration and function of the active terminal detection device 1 according to the embodiment are described with reference to FIGS. 3 and 4.

Figure 3:
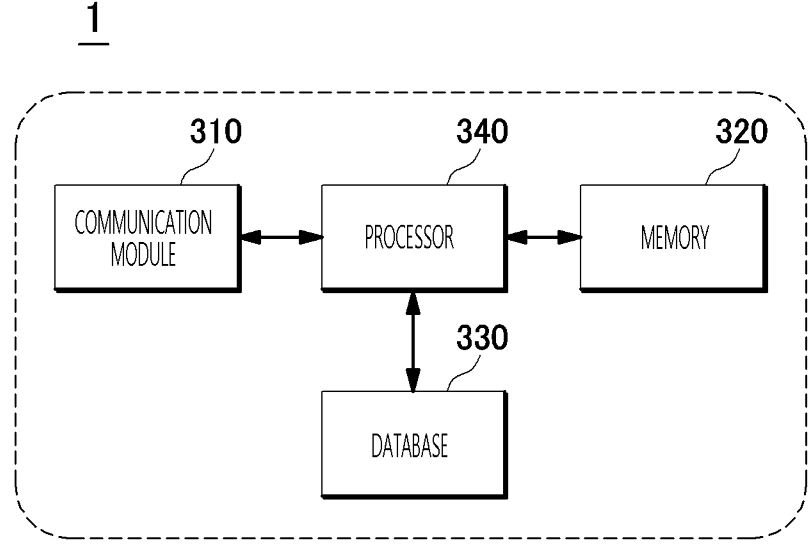
FIG. 3 is a configuration diagram of an active terminal detection device according to an embodiment.

FIG. 3 illustrates the configuration and function of the active terminal detection device 1 according to the embodiment.

Referring to FIG. 3, the active terminal detection device 1 includes a communication module 310, a memory 320, and a processor 340. The active terminal detection device 1 may transmit and receive data to and from the receiver 100 and a terminal in the coverage area of the receiver 100.

The communication module 310 includes a configuration for transmitting and receiving data to and from the receiver 100 or the devices 201 and 202. The communication module 310 may refer to a device including hardware and software required to transmit and receive signals, such as control signals or data signals, through wired or wireless connection to another network device. Additionally, the communication module 310 may be included in the active terminal detection device 1 as well as the receiver 100 and the devices 201 and 202.

The communication module 310 may use any type of wireless communication network, such as a mobile radio communication network or a satellite communication network. In addition, a wireless communication network includes, for example, third generation (3G), fourth generation (4G), fifth generation (5G), 3rd generation partnership project (3GPP), long term evolution (LTE), world interoperability for microwave access (WIMAX), Wi-Fi, Bluetooth communication, infrared communication, ultrasonic communication, visible light communication (VLC), LiFi, and so on but is not limited thereto.

In addition, the active terminal detection device 1 includes the memory 320 that may store an active terminal detection program and data, and the processor 340 that performs a series of mathematical processing for active terminal detection.

The memory 320 stores then active terminal detection program. A name of the active terminal detection program is set for the sake of convenience of description, and the name itself does not limit a function of the program. The memory 320 may store at least one of information and data input to the communication module 310, information and data required for functions performed by the processor 340, and data generated according to execution of the processor 340.

The memory 320 includes a nonvolatile storage device that continuously maintains the stored information even when power is not supplied thereto and a volatile storage device that requires power to maintain the stored information. In addition, the memory 320 may perform a function of temporarily or permanently storing the data processed by the processor 340. The memory 320 may include magnetic storage media or flash storage media in addition to the volatile storage devices that require power to maintain the stored information, but the scope of the present disclosure is not limited thereto.

The active terminal detection device 1 may further include a database 330. The database 330 may refer to a configuration in which data for an operation of an active terminal program is stored. The database 330 may form a part of the memory and may be outside the active terminal detection device 1 without being inside the active terminal detection device 1.

The processor 340 may execute an active terminal detection program stored in the memory 320. The processor 340 may include various types of devices that control and process data. The processor 340 may refer to a data processing device that includes a physically structured circuit to perform a function expressed as codes or instructions included in a program and is built in hardware. The processor 340 may include a microprocessor, a central processing unit (CPU), a processor core, a multiprocessor, an application-specific integrated circuit (ASIC), a field programmable gate array (FPGA), or so on, but the scope of the present disclosure is not limited thereto.

Figure 4:
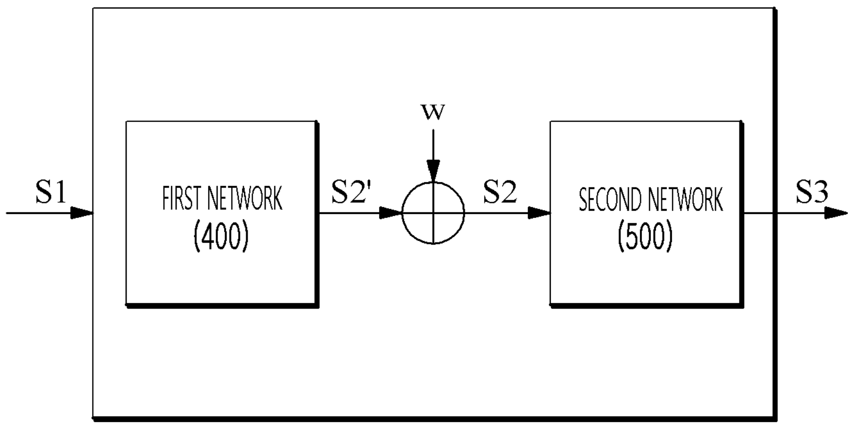
FIG. 4 is a conceptual diagram illustrating a functions of a processor according to an embodiment.

FIG. 4 is a conceptual diagram illustrating a function of the processor 340. Hereinafter, the function of the processor 340 is described with reference to FIG. 4.

The processor 340 may set a first learning network 400 through which a first signal generated by each of a plurality of terminals is transmitted to the receiver 100, and a second learning network 500 that determines whether each of the plurality of terminals is active. The processor 340 may form an end-to-end deep neural network including the first learning network 400 and the second learning network 500.

The first learning network 400 may perform a function of combining a spread code with the first signal generated by a terminal. The second learning network 500 may perform a function of determining whether a terminal is active.

The first learning network 400 and the second learning network 500 may include all configurations for performing a function of modeling and learning a relationship between an input and an output, such as an artificial neural network (ANN), a neural network, deep learning, and machine learning.

Specifically, the processor 340 may correspond to an artificial neural network including a transmitter (machine-type communication terminals 201 and 202) and the receiver (base station) 100. Accordingly, the active terminal detection device 1 may use the terminals 201 and 202, a receiver, and an end-to-end deep neural network including the first learning network 400 and the second learning network 500.

When using a scheduling-based orthogonal multiple access (OMA) method, performance of massive-machine-type communication may be reduced due to lack of resources and excessive signaling overhead.

Accordingly, the processor 340 enables the massive machine-type communication by using a grant-free non-orthogonal multiple access (GF-NOMA) method. By using the GF-NOMA method, terminal devices may transmit data by using a non-orthogonal spreading sequence without complex scheduling. In order to use the GF-NOMA method, the active devices 201 have to be identified from among all devices in a coverage area of the receiver 100.

In order to apply the GF-NOMA method, an active terminal detection step is an essential. In order to perform the active terminal detection step, a step is performed in which a transmitter generally assigns spread codes to devices and the receiver detects an active device by using the spread code.

Accordingly, the processor 340 includes the first learning network 400 that combines a spread code with the device and the second learning network 500 that determines whether the device is active.

First, a method of deriving a second signal S2 by combining the spread code with a first signal S1 generated by each of a plurality of terminals by using Equation 1 and Equation 2 below is described.

$$\delta_n \sim \mathrm{Bern}(p_n), \quad \text{Equation 1}$$

Here, δn refers to an activity indicator vector of the n-th terminal, and has a value of 0 when the n-th terminal is an inactive terminal and outputs 1 when the n-th terminal is an active terminal. Bern refers to Bernoulli distribution, and Pn refers to activation probability of the n-th terminal.

$$y = \sum_{n=1}^{N} s_n h_n \delta_n x_n + w = Sq + w \quad \text{Equation 2}$$

Here, N refers to the number of terminals in a coverage area of the receiver 100, and sn refers to an n-th spread code. $h_n$ refers to a channel between the n-th terminal and the receiver 100, δn refers to an activity indicator vector of the n-th terminal, and $x_n$ refers to a data symbol of the n-th terminal. Accordingly, S refers to a spread matrix, q refers to a composite vector of the terminal symbol and channel, and w refers to additive white Gaussian noise (AWGN).

The first learning network 400 assigns a spread code to the first signal S1 by using Equation 1 and Equation 2 described above. Accordingly, x1 to xn, which refer to the n-th terminal, may correspond to the first signal S1. The first signal S1 may refer to a data signal transmitted from a terminal to the receiver 100.

In addition, when it is assumed that the number of active terminals with sparsity is K, an active terminal detection problem may be defined by Equation 3 below.

$$\tilde{\delta} = \arg \min_{\|\delta\|_0 = K} \|y - Sq\|_2^2 \quad \text{Equation 3}$$

Here, K refers to the number of active terminals, y refers to the second signal S2 derived by Equation 2 described above, S refers to a spread matrix, and q refers to a composite vector of a terminal symbol and a channel.

The active terminal detection problem may be solved by using a greed sparse recovery algorithm, such as orthogonal matching pursuit (OMP).

$$\min_{S} \max_{1 \le i \ne j \le N} \frac{|\langle s_i, s_j \rangle|}{\|s_i\|_2 \|s_j\|_2} \text{ and } \min_{S} \|I - S^T S\|_F^2 \quad \text{Equation 4}$$

Here, N refers to the number of terminals, and Si and Sj refer to spread codes of different terminals among a plurality of terminals. Accordingly, Equation 4 refers to an equation for searching for a terminal with the lowest cross-correlation value by comparing the spread codes assigned to the terminal.

However, by using the method of detecting active terminals by simply minimizing a cross-correlation value of a spread code, active terminal detection performance may be reduced in a massive machine-type communication environment where transmission probabilities of devices are different from each other. Accordingly, in a massive machine-type communication environment, a method of designing a spread code to reduce a cross-correlation value of a frequently activated terminal is more effective.

Accordingly, the processor 340 may measure an active terminal detection error value of the entire network and perform iterative learning by using an active terminal detection error as a loss function. That is, the active terminal detection device 1 configures an end-to-end network including the devices 201 and 202 and the receiver 100 and derives a spread code to reduce a cross-correlation value of a terminal with a high activation probability through iterative learning using an active terminal detection error as a loss function.

In this case, deriving a spread code to reduce a cross-correlation value of a terminal with a high activation probability may include deriving a spread code to reduce a cross-correlation value of a terminal with activation probability greater than or equal to a preset reference value or deriving a spread code to reduce a cross-correlation value in the order of terminals with a high activation probability.

The processor 340 may include the first learning network 400 as a spread network (SN) that models activation, channels, and data symbol spreading on the transmitter side. In addition, the receiver 100 may include the second learning network 500 as an active terminal detection network that estimates active terminals.

As illustrated in FIG. 4, the processor 340 may use an end-to-end deep neural network including the first learning network 400 and the second learning network 500 as a sub-network. The processor 340 may perform learning by using Equation 5 to Equation 7 below.

$$L(\delta, \hat{\delta}) = -\sum_{n=1}^{N} \left(\delta_n \log(\hat{\delta}_n) + (1 - \delta_n)\log(1 - \hat{\delta}_n)\right) \quad \text{Equation 5}$$

Here, $\hat{\delta}$ refers to an estimated activity indicator vector, and $\delta_n$ and $\hat{\delta}_n$ refer respectively to elements of and δ and $\hat{\delta}$.

$$\hat{\delta} = g(x; \Theta) \quad \text{Equation 6}$$

Here, $\hat{\delta}$ refers to an estimated activity indicator vector, x refers to an input symbol vector including terminals of x1 to xN, Θ refers to a set of all network parameters including spread codes, and g refers to a matching function between the input x and a network output.

$$\Theta_j = \Theta_{j-1} - \eta \nabla_\Theta L(\Theta_{j-1}) \quad \text{Equation 7}$$

Here, Θj refers to a parameter of the j-th training iteration, η refers to a learning rate, and ∇ΘL(·) refers to a gradient of a loss function for a stochastic gradient descent (SGD) algorithm.

Accordingly, the active terminal detection device 1 performs learning of a network by using an error of active terminal detection as binary cross entropy loss according to the stochastic gradient descent algorithm by using Equation 5 to Equation 7 described above.

Figure 5:
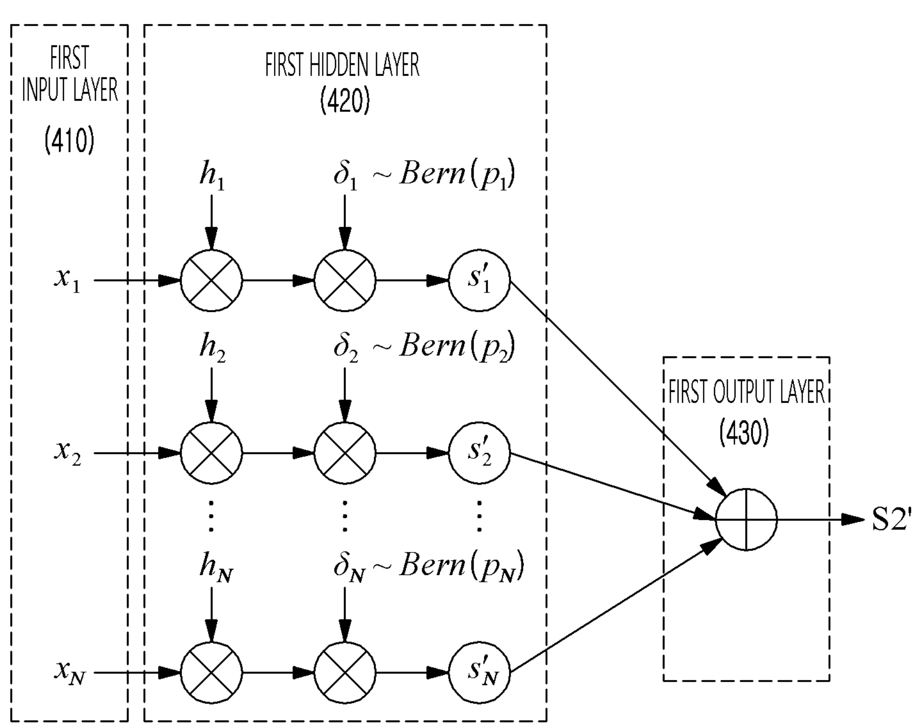
FIG. 5 is a configuration diagram of a first learning network according to an embodiment.

That is, referring to FIG. 5, in an operating method of the processor 340, the first learning network 400 receives the first signal S1 (an input signal, a data symbol) and generates a spread signal S2' by assigning spread codes to a plurality of terminals.

In this case, the processor 340 may include additive white Gaussian noise (AWGN) w in the spread signal S2'. Therefore, the second signal S2 indicates that the spread signal S2' of FIG. 5 generated by the first learning network includes the additive white Gaussian noise. That is, the second signal S2 is derived by Equation 1 and Equation 2.

In addition, the second signal S2 is input to the second learning network 500, and the second learning network 500 generates a third signal S3, which determines whether a terminal is active, by using the second signal S2. Detailed configurations of the first learning network 400 and the second learning network 500 are described with reference to FIGS. 6 and 7 to be described below.

Hereinafter, the configuration of the first learning network 400 according to an embodiment is described with reference to FIG. 5.

FIG. 5 is a configuration diagram of the first learning network 400 according to an embodiment.

Referring to FIG. 5, the first learning network 400 includes a first input layer 410 that receives the first signal S1, a first hidden layer 420 that adds a spread code to the first signal S1, and a first output layer 430 that outputs a second output signal S2' obtained by multiplying variables of the first hidden layer 420 by each other.

In addition, the first learning network 400 assigns a trainable vector to the n-th terminal (x1 to xN) instead of using deterministic spreading sequences. Accordingly, the spread code is included in network parameters learned by a stochastic gradient descent algorithm, and adds an activity indicator vector of a terminal according to Bernoulli distribution to terminal symbols x1 to xN to model activation of the terminal.

In addition, the first learning network 400 transmits values obtained by multiplying the vector x corresponding to the data symbols x1 to xN included in the first signal S1 by a spread matrix S corresponding to a spread code to the second learning network as a transmitter.

That is, the first signal S1 may include input signals or data symbols received from a plurality of terminals in a coverage area of the receiver 100. Accordingly, x1 refers to a data symbol of the first terminal, x2 refers to a data symbol of the second terminal, and xN refers to a data symbol of the N-th terminal. Accordingly, the first signal S1 includes data symbols of N terminals of x1 to xN, and the first input layer 410 receives the data symbols x1 to xN of respective terminals included in the first signal S1 as an input.

The first hidden layer 420 learns to reduce active terminal detection errors by using active terminal detection, activation probability of a terminal, channels, the number of terminals, and so on. That is, a spread code may be derived such that the higher the activation probability of a terminal in various communication environments of the first hidden layer 420, the lower a cross-correlation value of the spread code. The derived spread code may be added to each of the data symbols x1 to xN of respective terminals included in the first signal S1.

In addition, the first learning network 400 may include a single-layer linear neural layer because the input data is linearly multiplied by the spread code.

The first output layer 430 generates the spread signal S2', which includes data obtained by assigning a spread code to each terminal, from the first hidden layer 420 and transmits the spread signal S2' to the second learning network 500 of the receiver 100 by using a channel.

Hereinafter, a configuration of the second learning network 500 according to the embodiment is described with reference to FIG. 6.

Figure 6:
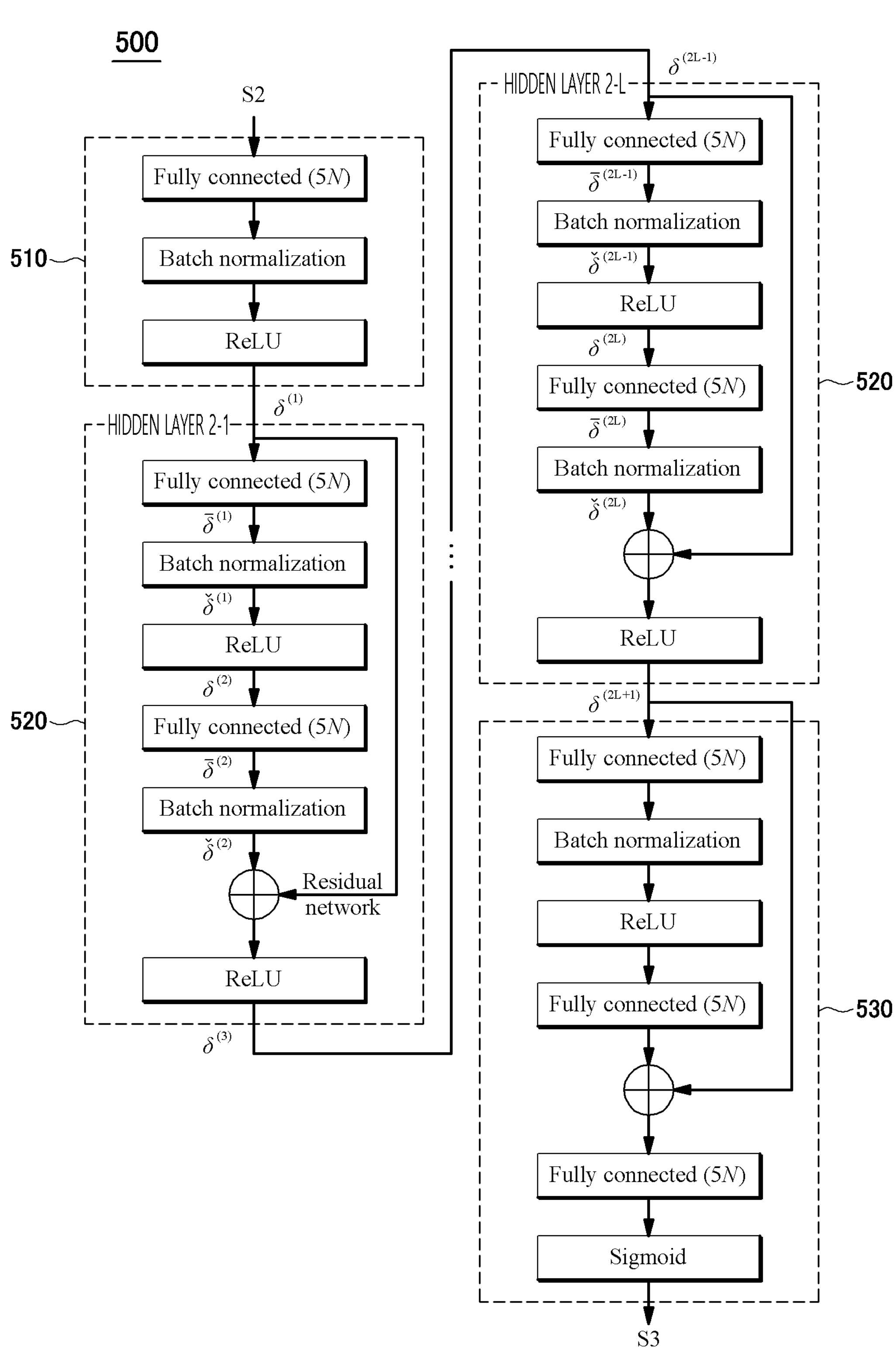
FIG. 6 is a configuration diagram of a second learning network according to an embodiment.

FIG. 6 is a configuration diagram of the second learning network 500 according to an embodiment.

Referring to FIG. 6, the second learning network 500 includes a second input layer 510, a second hidden layer 520, and a second output layer 530. The second learning network 500 estimates an active state of a terminal from the second signal S2 as a receiver. Accordingly, the second learning network 500 may correspond to an active terminal detection network.

The second learning network 500 may identify the activity indicator vector δ of a terminal from the second signal S2 (y). The number of active devices 201 is less than the number of inactive terminals 202 in a massive machine-type communication environment, and accordingly, the activity indicator vector δ may be modeled as a sparse vector.

The second learning network 500 may identify the sparse vector by using Equation 8 to Equation 14 below.

$$\min_{\|q\|_0 = K} \|y - Sq\|_2^2 \qquad \text{Equation 8}$$

Here, y refers to the second signal S2, S refers to a spread matrix, q refers to a composite vector of a terminal symbol and a channel, and K refers to the number of active terminals.

$$q^{(t+1)} = H_K[(I_N - S^T S)q^{(t)} + S^T y] \qquad \text{Equation 9}$$

Here, S refers to a spread matrix, q(t) is an estimated value of the sparse vector q after t iterations, HK[·] is a hard thresholding operator to apply sparsity K of an output vector, and y refers to the second signal S2.

$$\delta^{(t+1)} = \mathrm{ReLU}[\Psi^{(t)}\delta^{(t)} + \beta^{(t)}] \qquad \text{Equation 10}$$

Here, ReLU refers to an activation function (rectified linear unit), δ(t) refers to an input of a t-th layer, δ(t+1) refers to an output of the t-th layer, ψ(t) refers to a weight, and β(t) refers to a bias value.

$$\overline{\delta}^{(t)} = \Psi^{(t)}\delta^{(t)} + \beta^{(t)} = \left[\overline{\delta_1}^{(t)} \ \ldots \ \overline{\delta_{5N}}^{(t)}\right] \qquad \text{Equation 11}$$

Here, δ(t) refers to the input of the t-th layer, ψ(t) refers to the weight, β(t) refers to the bias value, and $\overline{\delta}^{(t)}$ refers to the normalized data.

$$\delta_i^{\vee(t)} = \frac{\overline{\delta}_i^{(t)} - \mu_{B,i}}{\sigma_{B,i}}, \text{ for } i = 1, \ldots, 5N \qquad \text{Equation 12}$$

Here, $\overline{\delta}^{(t)}$ refers to the normalized data, $\check{\delta}^{(t)}$ refers to an output of a batch normalization (BN) layer, and μB,i and σB,i refer respectively to a mini-batch average and a variance.

$$\delta^{(t+1)} = \mathrm{ReLU}[\check{\delta}^{(t)} + \delta^{(t-1)}] \qquad \text{Equation 13}$$

Here, δ(t) refers to the input of the t-th layer, δ(t+1) refers to an output of the t-th layer, and ReLU refers to the activation function (rectified linear unit).

$$\alpha^* = \arg\min_{\alpha}\left(\left|\left((b, n) \mid \hat{\delta}_n^{[b]} \leq \alpha, \text{ if } \delta_n^{[b]} = 1\right)\right| + \left|\left((b, n) \mid \hat{\delta}_n^{[b]} \leq \alpha, \text{ if } \delta_n^{[b]} = 0\right)\right|\right) \qquad \text{Equation 14}$$

Here, $\hat{\delta}^{(t)}$ refers to an expected activity indicator mapped between 0 and 1 by using a sigmoid activation function. That is, $\hat{\delta}^{(t)}$ may correspond to the third signal S3. In addition, α refers to a threshold. Accordingly, when the n-th expected activity indicator value $\hat{\delta}_n$ is greater than the threshold α, the n-th terminal is determined to be in an active state, and accordingly, 1 is output. In addition, when $\hat{\delta}_n$ is less than the threshold α, the n-th terminal is determined to be in an inactive state, and accordingly, 0 is output.

That is, a structure of the second learning network 500 may include an interactive hard thresholding (IHT) algorithm to recover a sparse vector. Therefore, one calculation for estimating a vector by the IHT algorithm is replaced by one neural layer by the second learning network 500. Accordingly, the second learning network 500 may include a plurality of hidden layers 520, from a hidden layer 2-1 to a hidden layer 2-L.

In addition, the learning effect of deep learning increases only when there are enough nodes in one second hidden layer 520. Accordingly, assuming that the total number of terminals is N, the number of nodes in the second learning network 500 may be set to 5N. In this case, the number of nodes of the second learning network 500 according to the embodiment is not limited to 5N and may refer to the number of nodes greater than the total number of terminals in order to obtain a sufficient learning effect.

In addition, the second learning network 500 may include batch normalization (BN) and a residual network (ResNet). The BN may reduce the amount of data change by fixing the mean and variance of input data of each layer included in the second learning network 500 to 0 and 1 for each number of mini batches. Accordingly, the BN reduces the amount of data change in mean and variance, allowing the second learning network 500 to perform learning.

The ResNet may prevent a vanishing gradient problem in which update information is lost as the number of layers increases. In other words, the ResNet performs learning of the second learning network 500 by directly connecting a neural layer separated from the ResNet and transmitting update information, each time the network is repeated.

Hereinafter, an active terminal detection method according to an embodiment is described with reference to FIG. 7.

Figure 7:
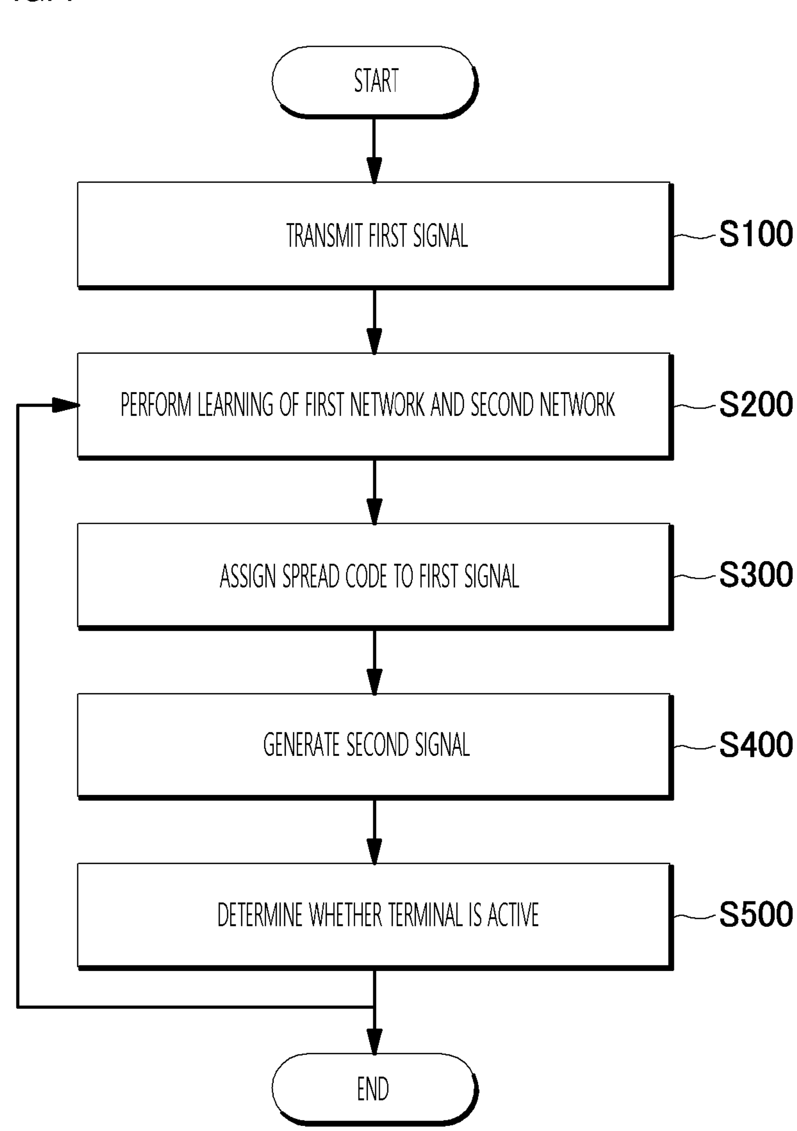
FIG. 7 is a flowchart of an active terminal detection method according to an embodiment.

FIG. 7 is a flowchart of the active terminal detection method according to the embodiment.

Referring to FIG. 7, in step S100 of transmitting a first signal, the first learning network 400 receives the first signal S1 as an input. Specifically, data symbols x1 to xN, which are included in the first signal S1 and respectively corresponding to a plurality of terminals, are transmitted to the first input layer 410.

In step S200 of performing network learning, learning of the first learning network 400 and the second learning network 500 is performed to reduce an active terminal detection error. Specifically, the first learning network 400 performs learning by using the active terminal detection error as a loss function. In addition, the first learning network 400 learns such that a cross-correlation value of a spread code decreases as activation probability of a terminal increases. The second learning network 500 learns such that an activation state tracking error value of a terminal is reduced by using the active terminal detection error as the loss function.

However, the first learning network 400 and the second learning network 500 according to the embodiment are not limited to simply performing learning by using an active terminal detection error as a loss function, and may perform learning including variables, which are related to derivation of a spread code, such as activation probability of a terminal, channels, and the number of terminals, and all variables related to detection of an active terminal.

In step S300 of assigning a spread code, the active terminal detection device 1 generates a learned spread code and combines the spread code with the first signal S1 by using the first learning network 400. The active terminal detection device 1 may generate a learned active code by using the first learning network 400. The first learning network 400 derives the learned spread code to reduce an active terminal detection error by using various data related to the spread code, such as an active terminal detection error, activation probability of a terminal, channels, and the number of terminals. Accordingly, the first hidden layer 420 derives a spread code such that a cross-correlation value decreases as the activation probability of a terminal increases in various communication environments.

In step S300 of assigning a spread code, the active terminal detection device 1 adds the derived spread code to the data symbols x1 to xN which are included in the first signal S1 and respectively correspond to a plurality of terminals, by using the first learning network 400. That is, the spread signal S2' is generated by multiplying the vector x corresponding to the data symbol by the spread matrix S.

In step S300 of assigning a spread code, the active terminal detection device 1 may generate the second signal S2, to which white Gaussian noise is added, by adding additive white Gaussian noise (AWGN) w to the second signal S2' generated by the first learning network 400.

In step S400 of generating the second signal S2, the active terminal detection device 1 estimates whether a terminal is in a coverage area of the receiver 100 or the base station BS by using the second learning network 500 and the second signal S2. In addition, a terminal activation detection error value and data, which are differences between an estimated value of terminal activeness derived in step S500 of determining whether the terminal is active and actual activeness of the terminal, may be used for learning of the first learning network 400 and the second learning network 500 in step S200 of performing the network learning.

Hereinafter, active terminal detection error values of the active terminal detection method according to the embodiment and active terminal detection error values of the active terminal detection method of the related art are described with reference to FIG. 8.

Figure 8:
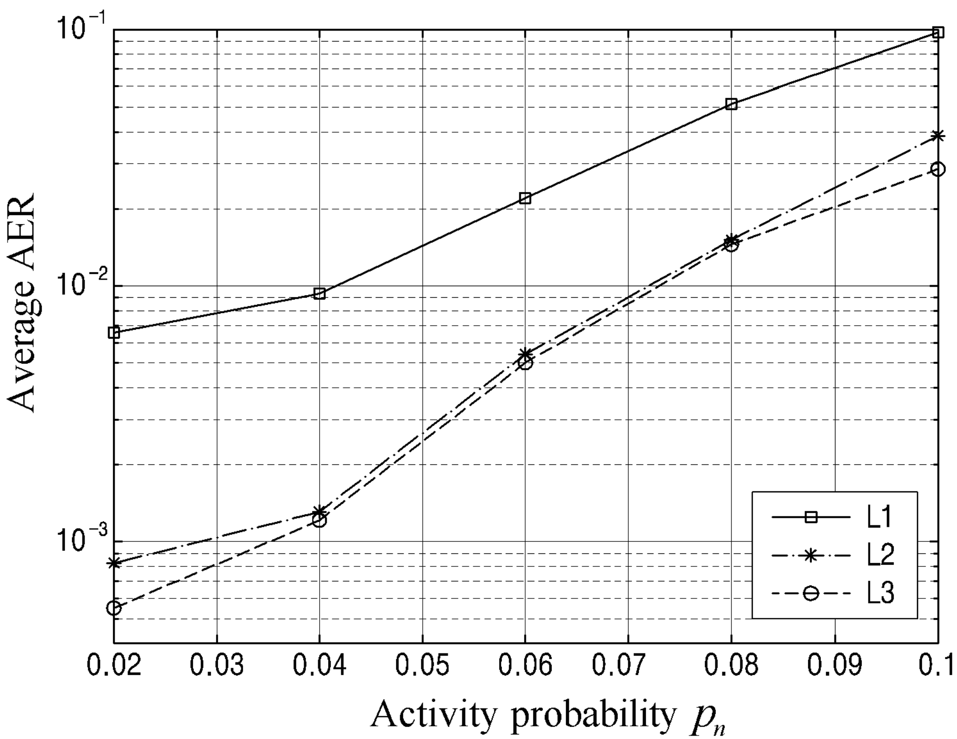
FIG. 8 is a graph illustrating average values of active terminal detection errors according to activation probability when an SNR value is 20 dB and when device activation probabilities are equal to each other.

FIG. 8 is a graph illustrating average values of active terminal detection errors according to activation probability when an SNR value is 20 dB and when device activation probabilities are equal to each other.

Referring to FIG. 8, the x-axis denotes activity probability $P_n$ of the n-th terminal, and the y-axis denotes an average activity error rate (Average AER) of an active terminal. L1 represent a result value according to a Gaussian random sequence, L2 represents a result value according to the known sequence, and L3 represents a result value measured by the active terminal detection method according to the embodiment.

When using the Gaussian random sequence, a cross-correlation value between spread codes increases, and accordingly, an average value of an active terminal detection error is measured to be the highest, and the result value according to the known sequence has a higher error value than the result value measured by the active terminal detection method according to the embodiment. Accordingly, it can be seen that, by using the active terminal detection method according to the embodiment, performance increases compared to the known sequences.

Hereinafter, active terminal detection error values according to the active terminal detection method of the embodiment and active terminal detection error values according to the active terminal detection method of the related art are described with reference to FIG. 9.

Figure 9:
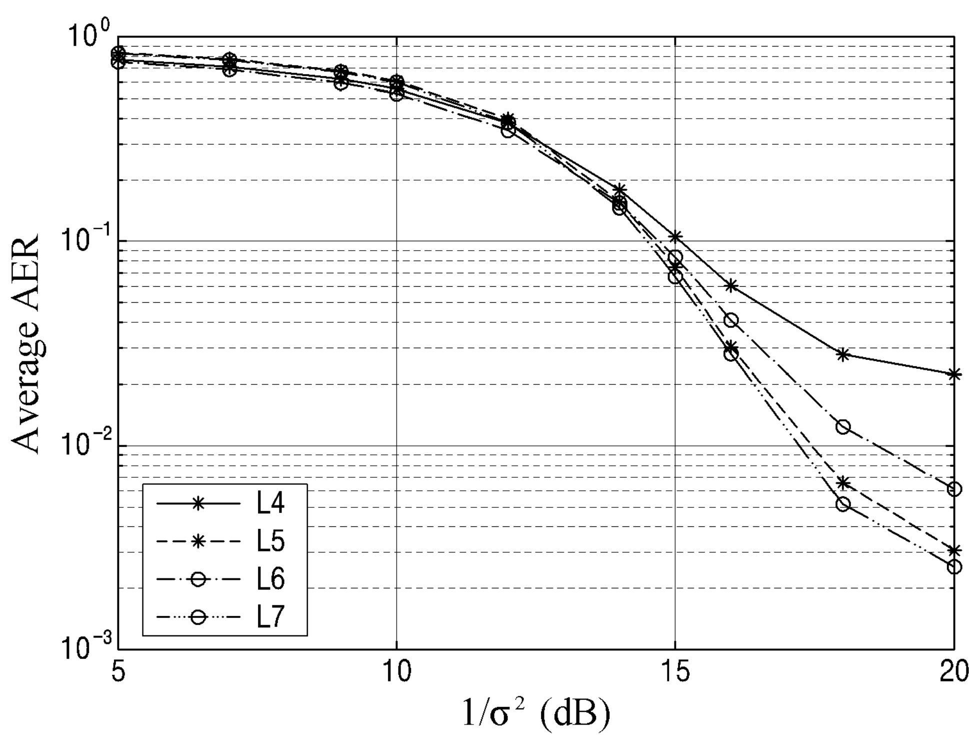
FIG. 9 is a graph illustrating average values of active terminal detection errors according to an SNR value when device activation probabilities are different from each other.

FIG. 9 is a graph illustrating average values of active terminal detection errors according to an SNR value when device activation probabilities are different from each other.

Referring to FIG. 9, the x-axis denotes an SNR value ($1/\sigma^2$), and the y-axis denotes an average activity error rate (Average AER). Scenario 1 refers to a case where activation probability is 1 to 20%, and scenario 2 refers to a case where the activation probability is 1 to 10%.

In scenario 1, L4 represents a value of Average AER according to the method of related art. In scenario 2, L5 refers to a value of Average AER according to the method of related art. In addition, in scenario 1, L6 refers to a value of Average AER derived by the active terminal detection method according to the embodiment. In scenario 2, L7 refers to a value of Average AER derived by the active terminal detection method according to the embodiment.

In scenario 1, the value of Average AER derived by the active terminal detection method according to the embodiment has a performance gain of about 3 dB compared to the method of related art.

In addition, in scenario 2, the value of Average AER derived by the active terminal detection method according to the embodiment has a performance gain of about 0.5 dB compared to the method of related art. Accordingly, in both scenario 1 and scenario 2, it can be seen that the active terminal detection method according to the embodiment has increased active terminal detection performance compared to the method of related art.

Hereinafter, cross-correlation values of spread codes according to the active terminal detection method of the embodiment and cross-correlation values of spread codes according to the active terminal detection method of related art are described with reference to FIG. 10.

Figure 10:
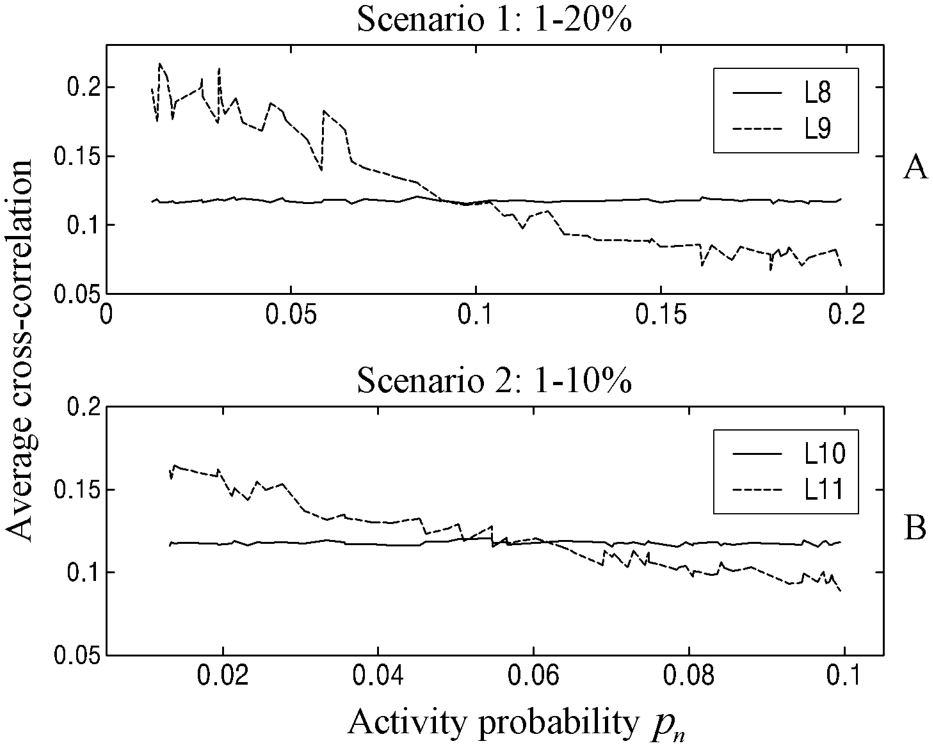
FIG. 10 illustrates graphs of mutual correlation values according to activation probability when device activation probabilities are different from each other.

FIG. 10 illustrates graphs of cross-correlation values according to activation probability when activation probabilities of devices are different from each other.

Referring to FIG. 10, the x-axis denotes activity probability $P_n$ of the n-th terminal, and the y-axis denotes an average activity error rate (Average AER) of an active terminal. A of FIG. 10 represents a graph of cross-correlation values of a spread code when activation probability is 1 to 20%, and B of FIG. 10 represents a graph of cross-correlation values of a spread code when activation probability is 1 to 10%.

In scenario 1, L8 illustrated in graph A of FIG. 10 represents a cross-correlation value of the known spread code. L9 illustrated in graph A represents a cross-correlation value of the spread code derived by the active terminal detection method and device according to the embodiments. In addition, in scenario 1, L10 illustrated in graph B of FIG. 10 represents a cross-correlation value of the known spread code. L11 illustrated in graph B represents a cross-correlation value of the spread code derived by the active terminal detection method and device according to the embodiments.

As illustrated in graph A and graph B, the known spread code has a constant cross-correlation value regardless of activation probability. However, the spread codes derived by the active terminal detection method and device according to the embodiments have different cross-correlation values depending on activation probabilities. That is, the more frequently the spread code, which is derived by the active terminal detection method and device according to the embodiments, is activated, the smaller the cross-correlation value compared with other devices.

Accordingly, the spread code derived by the active terminal detection method and device according to the embodiments is assigned in such a way that a spread code with less interference is assigned to a device that frequently transmits a signal. Because of this, a spread code more suitable for a massive machine-type communication environment may be derived.

Hereinafter, active terminal detection error values of the active terminal detection device and method according to the embodiments and the active terminal detection method of related art are described with reference to FIG. 11.

Figure 11:
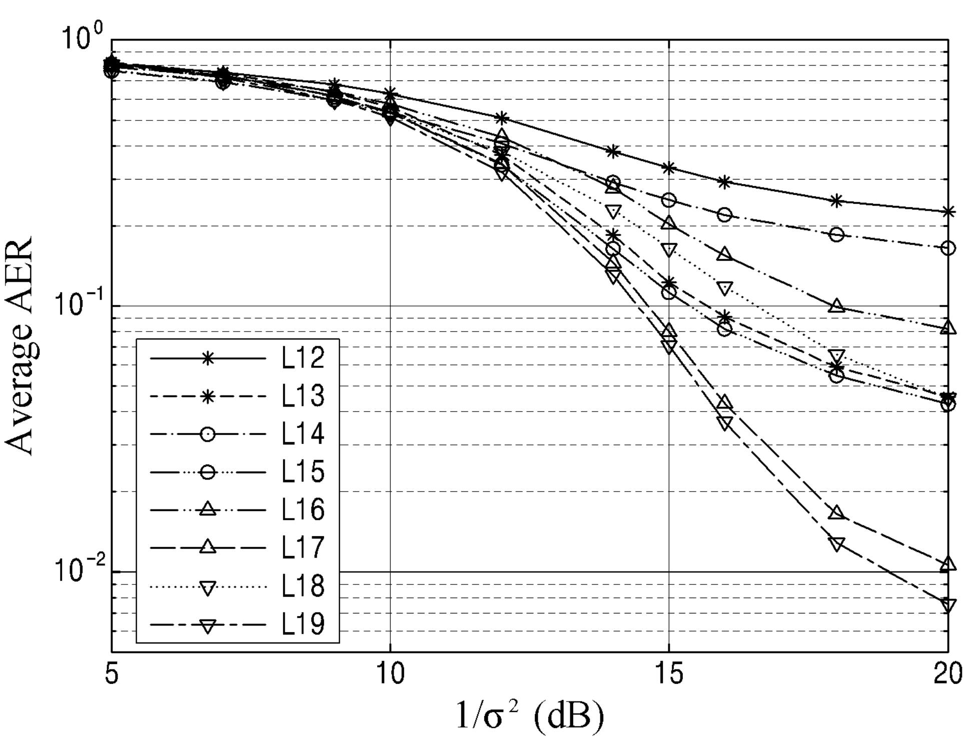
FIG. 11 is a graph illustrating average values of active terminal detection errors of OMP and CoSaMP detection algorithms according to SNR values when device activation probabilities are different from each other.

FIG. 11 is a graph illustrating average values of active terminal detection errors of OMP and CoSaMP detection algorithms according to SNR values when device activation probabilities are different from each other.

Referring to FIG. 11, the x-axis denotes an SNR value ($1/\sigma^2$), and the y-axis denotes an average activity error rate (Average AER).

In addition, in scenario 1, L12 represents a value of Average AER of an OMP algorithm using the known spread code. In scenario 2, L13 represents a value of Average AER of the OMP algorithm using the known spread code.

In scenario 1, L14 represents a value of Average AER of the OMP algorithm using a spread code derived by the embodiment. In scenario 2, L15 represents a value of Average AER of the OMP algorithm, which is derived by the embodiment.

In scenario 1, L16 represents a value of Average AER of a CoSaMP algorithm using the known spread code. In scenario 2, L17 represents a value of Average AER of the CoSaMP algorithm using the known spread code.

In scenario 1, L18 represents a value of Average AER of the CoSaMP algorithm using the spread code derived by the embodiment. In scenario 2, L19 represents a value of Average AER of the CoSaMP algorithm which is derived by the embodiment.

The active terminal detection method according to the embodiment has an increased performance gain by more than 4 dB compared to the method of related art. Accordingly, it can be seen that the active terminal detection method according to the embodiment increases in performance over a wider SNR range compared to the compressed sensing algorithm of related art.

According to the active terminal detection method and device of the embodiments, active terminal detection performance may be increased by deriving a spread code suitable for various communication environments (particularly, environments where devices have different transmission frequencies) including a massive machine-type communication environment.

One embodiment of the present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium and a communication medium. A computer storage medium includes both volatile and nonvolatile media and removable and non-removable media implemented by any method or technology for storing information, such as computer readable instructions, data structures, program modules or other data. The communication medium typically includes computer readable instructions, data structures, program modules, other data of a modulated data signal such as a carrier wave, or other transmission mechanism, and includes any information transmission medium.

Although the method and systems of the present disclosure are described with reference to specific embodiments, some or all of their components or operations may be implemented by using a computer system having a general-purpose hardware architecture.

The above description of the present disclosure is for illustrative purposes, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and likewise, components described as distributed may be implemented in a combined form.

The scope of the present disclosure is indicated by the following claims rather than the detailed description above, and the meaning and scope of the claims and all changes or modifications derived from the equivalent concepts should be interpreted as being included in the scope of the present disclosure.

What is claimed is:

1. An active terminal detection method for wireless communication between a plurality of terminals and a receiver, the active terminal detection method comprising:

providing an active terminal detection device executing a first learning network and a second learning network, wherein the first learning network is trained to generate a second signal to be transmitted to the receiver by applying a spread code to a first signal generated by each of the plurality of terminals and the second learning network is trained to determine whether each of the plurality of terminals is active;

generating, by the first learning network, the second signal corresponding to each of the plurality of terminals by combining the spread code with the first signal generated by each of the plurality of terminals; and determining, by the second learning network, whether each of the plurality of terminals is active based on the second signal, wherein the first learning network and the second learning network form an end-to-end learning structure, and wherein the first learning network includes a first hidden layer deriving the spread code in which a cross-correlation value of the spread code decreases as activation probability of the plurality of terminals increases.

2. The active terminal detection method of claim 1, wherein the first learning network and the second learning network are trained by using an error of active terminal detection as binary cross entropy loss according to a stochastic gradient descent algorithm.

3. The active terminal detection method of claim 1, wherein the first learning network is trained to reduce active terminal detection errors by using an error value, activation probability of each of the plurality of terminals, channels of the plurality of terminals and the receiver, and a number of the plurality of terminals.

4. The active terminal detection method of claim 1, wherein the second learning network is trained by using batch normalization and a residual network.

5. An active terminal detection device for wireless communication between a plurality of terminals and a receiver, the active terminal detection device comprising:

a memory storing an active terminal detection program; and a processor configured to execute the active terminal detection program, wherein the active terminal detection program forms an end-to-end learning structure by using a first learning network and a second learning network, wherein the first learning network is trained to generate a second signal to be transmitted to the receiver by assigning a spread code to a first signal generated by each of the plurality of terminals and the second learning network is trained to determine whether each of the plurality of terminals is active, generates the spread code using the end-to-end learning structure, generates, by the first learning network, the second signal corresponding to each of the plurality of terminals by combining the spread code with the first signal generated by each of the plurality of terminals, and determines, by the second learning network, whether each of the plurality of terminals is active based on the second signal, wherein the first learning network includes a first hidden layer deriving the spread code in which a cross-correlation value of the spread code decreases as the activation probability of the terminal increases.

6. The active terminal detection device of claim 5, wherein first learning network and the second learning network are trained by using an error of active terminal detection as binary cross entropy loss according to a stochastic gradient descent algorithm.

7. The active terminal detection device of claim 5, wherein the first learning network is trained to reduce active terminal detection errors by using an error value, activation probability of each of the plurality of terminals, channels of the plurality of terminals and the receiver, and a number of the plurality of terminals.

8. The active terminal detection device of claim 5, wherein the second learning network is trained by using batch normalization and a residual network.

* * * * *